United States Patent [19]

Witte

[11] 4,305,641
[45] Dec. 15, 1981

[54] OPTICAL MIXING ELEMENT
[75] Inventor: Hans-H. Witte, Munich, Fed. Rep. of Germany
[73] Assignee: Siemens Aktiengesellschaft, Berlin & Munich, Fed. Rep. of Germany
[21] Appl. No.: 57,124
[22] Filed: Jul. 11, 1979
[30] Foreign Application Priority Data Aug. 29, 1978 [DE] Fed. Rep. of Germany ....... 2837682

[51] Int. Cl.³ .............................................. G02B 5/14
[52] U.S. Cl. ................... 350/96.15; 350/96.16
[58] Field of Search ......................... 350/96.15, 96.16
[56] References Cited

U.S. PATENT DOCUMENTS 4,184,739  1/1980  d'Auria et al. ................... 350/96.15

OTHER PUBLICATIONS

Kawasaki et al., "Low Loss Access Coupler for Multimode Optical Fiber Distribution Networks", Applied Optics 7/77.
Hocker, "Unidirectional Star Coupler for Single-Fiber Distribution Systems", pp. 124 & 125, Optics Letters, 10/77.
Ozeki, "New Star Coupler Compatible with Single Multimode Fiber Data Links", 2/23/76, Communications Research Center, Ottawa, Canada.
Hill et al., Efficient Power Combiner for Multiplexing Multiple Sources to Single Fiber Optical Systems, Applied Physics Letters, 12/77.
Hudson et al., "The Star Coupler: A Unique Interconnection Component for Multimode Optical Waveguide Communications Systems", Applied Optics, 11/74.

Primary Examiner—John K. Corbin
Assistant Examiner—Rodney B. Bovernick
Attorney, Agent, or Firm—Hill, Van Santen, Steadman, Chiara & Simpson

[57] ABSTRACT

An optical mixing element characterized by two groups of light conducting fibers being connected to one another by a mixer stage. The mixing element of this type exhibits small insertion losses and is to ensure a uniform as possible distribution of power between the outgoing fibers. In order to reduce light losses, the fibers in at least one group such as the outgoing group are fused together without any gaps therebetween to form a fused zone which preferably exhibit a gradual taper. In one embodiment, a mixer stage comprises a glass rod and the fused zones of each of the fiber groups abut against the end surfaces of the rod and taper towards the rod. In another embodiment, the mixer stage forms a part of the constriction which is provided in the fused zone of a group of the light conducting fibers.

3 Claims, 1 Drawing Figure

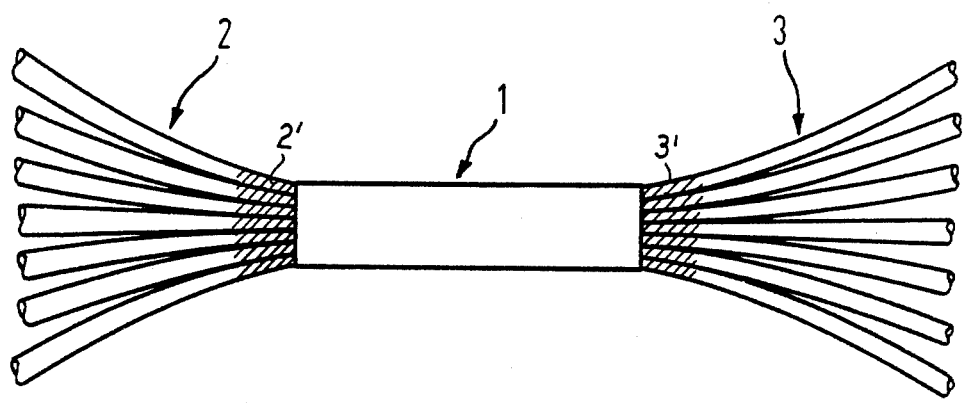

OPTICAL MIXING ELEMENT

BACKGROUND OF THE INVENTION

The present invention is directed to an optical mixing element wherein a mixing stage extends between an incoming group and an outgoing group of light conducting fibers.

In optical communication systems, in particular, in data bus configurations of a T-or star structure, optical mixers play a decisive role. Their function is to make available data transmitted by any one of n-terminal devices communicating with one another to all the other terminal devices with an intensity which is as equal as possible.

A mixer or mixing element of the type which extends between an incoming group of fibers and an outgoing group of fibers which is suitable for the above purposes is known and disclosed in an article by Marshall C. Hudson and Frank L. Thiel, "The Star Coupler: A Unique Interconnection Component for Multimode Optical Waveguide Communication Systems", *Applied Optics*, Vol. 13, No. 11, November 1974, pages 2540-2545. In this article, a mixer stage, which comprises a cylindrical glass rod having end surface abutting against the groups of fibers is disclosed. However, this mixer has high insertion losses of 6 to 8 dB and also does not ensure a sufficiently uniform distribution of power to the outgoing fibers.

SUMMARY OF THE INVENTION

The object of the present invention is to provide a mixer element which possesses low insertion losses and in addition ensure the uniform distribution of intensity or power between the outgoing fibers. To accomplish these aims, the present invention is directed to an improvement in an optical mixing element having a mixing stage extending between an incoming group of light conducting fibers and an outgoing group of light conducting fibers. The improvement comprises at least one group of light conducting fibers being fused together without any gaps between adjacent fibers adjacent to the mixing stage to form a fused zone, said fused zone having a tapered configuration. Thus, the fusion of the fibers in the fused zone will fuse the fibers to one another without any non-light conducting interspaces being present.

Preferably, the mixing element is designed in such a manner that the fused zone of the fibers tapers toward the mixer stage.

An advantageous embodiment of the proposed mixing element is designed in such a manner that the incoming and outgoing groups of fibers are a single bundle of continuous fibers and the bundle of light conducting fibers have a constriction disposed at the fused zone which fused zone forms the mixing stage.

In another advantageous variation of the mixing stage consists of a rod of transparent material. The groups of light conducting fibers abut each end of the rod and are second thereto.

A proposed mixing element can advantageously be produced by the following process or method steps. Grouping a plurality of fibers into a bundle of fibers with the grouping including intimately contacting each of the fibers along a section; heating the bundle of fibers to a softening point in the specific zone or section and while heating the bundle holding the bundle under tension to form the fused zone without any gaps or spaces between the fibers.

If the outer fibers of the group or bundle in addition to the central fibers are fused together which can be easily achieved by adequate heating, the above mentioned procedure is sufficient to produce the one advantageous embodiment of the proposed mixing element in which the mixing stage is formed at the constriction in the fused zone.

The second advantageous embodiment is produced in that the group or bundle of fibers is severed at the point of constriction and the end surfaces of the severed groups of fibers are then polished and joined to end surfaces of the rod of transparent material which forms the mixing stage.

The proposed mixing element according to the present invention exhibits low insertion losses and ensure a sufficient uniform distribution of the power or intensity between the outgoing fibers. In addition, the mixing element can be produced extremely simply by an extremely simple process as mentioned hereinabove.

BRIEF DESCRIPTION OF THE DRAWING

The FIGURE is a side view of a mixing element in accordance with the present invention.

DESCRIPTION OF THE PREFERRED EMBODIMENT

The principles of the present invention are particularly useful in a mixing element illustrated in the FIGURE which utilizes a rod of transparent material 1 as a mixing stage which is interposed between an incoming group of fibers 2 and an outgoing group of fibers 3. As illustrated, the incoming group of fibers 2 abuts and is joined to one end of the transparent rod 1 while the other group of fibers 3 is joined to and abut against the other end surface. The rod 1 forming the mixing stage can consist of a cylindrical glass rod as in the prior art and the rod forms the actual mixing stage. In the illustrated embodiment, the ends of the glass fiber groups 2 and 3 which abut against the rod 1 are fused together without gaps to form fusion zones 2' and 3', respectively. Each of the fusion zones 2' and 3' tapers toward the glass rod 1 and in the FIGURE are denoted by the shaded area.

Preferably, the groups 2 and 3 are secured to mixer stage or rod 1 by means of a transparent adhesive. In addition, the cross section of the ends of the groups at the fusion zones 2' and 3' are matched to the cross section of the mixing rod 1.

It should also be noted that the surface modes formed by the reduction of the size of the fiber group cross section do not lead to radiation mode. For example, the relationship of $n_M \cdot \sin \phi \leq 1$, is always fulfilled when $n_M$ is the index of refraction of the surface material of the glass fibers and $\phi$ is the angle between the beam and the surface normal.

The index of refraction of the adhesive employed is to be selected so that any total reflection at the tapered end of the group of fibers is avoided.

The light, which is coupled from the mixing rod into the outgoing group of fibers is first conducted partially in the form of surface modes, which are repeatedly reconverted into core modes due to the widening of the outgoing group.

The incoming group of fibers need not necessarily be fused so that there is no space between the fibers. In other words, an interspace between fibers of the incoming group is permissible. However, in the case where the incoming group does have spacing between adjacent fibers, the total cross section of the incoming group of fibers should correspond to the cross section of the end of the mixing rod forming the mixing stage.

Although various minor modifications may be suggested by those versed in the art, it should be understood that I wish to embody within the scope of the patent granted hereon, all such modifications as reasonably and properly come within the scope of my contribution to the art.

I claim:

1. In an optical mixing element comprising a mixing stage extending between an incoming group and an outgoing group of light conducting fibers the improvement comprising said mixing stage being a rod of transparent material with end surfaces, at least one of said groups of light conducting fibers being fused together without any gaps between adjacent fibers at an end of said group to form a fused zone having a fused end surface free of gaps between the ends of the fibers, said fused zone having a tapered configuration, which tapers toward the fused end surface, and said rod having its end surfaces abutting against and being joined to the ends of the groups of fibers with the fused end surface abutting against and being joined to one of the end surfaces of the rod.

2. In an optical mixing element according to claim 1, wherein each group of fibers is fused together without any gaps between adjacent fibers at an end of the group to form a fused zone having a fused end surface free of gaps between the ends of the fibers, said fused zone having a taper configuration which tapers toward the fused end surface.

3. A method for producing an optical mixing element having a mixing stage of a rod of transparent material extending between two groups of light conducting fibers with the groups of light conducting fibers being fused together without any gaps between adjacent fibers adjacent the end of the group to form a fused zone with a fused end surface, said method comprising grouping a plurality of fibers into a bundle of fibers, heating said bundle of fibers to the softening point in a specific zone, and while heating the bundle holding the bundle under tension to form the fused zone free of gaps and having a constriction, subsequently severing the fused bundle of fibers at the point of the constriction to form two groups with ends having a fused zone with a fused end surface, and then joining the fused end surfaces of the groups to the end surfaces of the rod of transparent material which forms the mixing stage.

* * * * *